(12) United States Patent
Wong

(10) Patent No.: US 11,825,978 B2
(45) Date of Patent: Nov. 28, 2023

(54) SYSTEMS AND METHODS FOR IMPROVED BREWING OF GROUND COFFEE

(71) Applicant: Sheldon Wong, Redwood City, CA (US)

(72) Inventor: Sheldon Wong, Redwood City, CA (US)

( * ) Notice: Subject to any disclaimer, the term of this patent is extended or adjusted under 35 U.S.C. 154(b) by 88 days.

(21) Appl. No.: 17/459,123

(22) Filed: Aug. 27, 2021

(65) Prior Publication Data

US 2023/0066349 A1 Mar. 2, 2023

(51) Int. Cl.
| A47J 31/44 | (2006.01) |
| A47J 31/06 | (2006.01) |
| A23F 5/26 | (2006.01) |
| A22C 9/00 | (2006.01) |

(52) U.S. Cl.
CPC ........... *A47J 31/0663* (2013.01); *A23F 5/26* (2013.01); *A47J 31/44* (2013.01); *A22C 9/001* (2013.01)

(58) Field of Classification Search
CPC .... A47J 31/44; A47J 31/0631; A47J 31/0663; A22C 9/001; A22C 17/0053; A23B 4/28; A23F 5/26
USPC .................................. 99/287, 516, 532, 533
See application file for complete search history.

(56) References Cited

U.S. PATENT DOCUMENTS

| 3,296,953 | A | * | 1/1967 | Bjorn-Henriksen ... | A23B 4/285 99/533 |
| 10,779,549 | B1 | * | 9/2020 | Hammad-Randolph ..................... | A22C 9/001 |
| 2008/0148957 | A1 | * | 6/2008 | Zanetti .................. | A47J 31/369 99/279 |
| 2009/0311957 | A1 | * | 12/2009 | Ferencik ................ | A47J 43/16 452/146 |
| 2011/0083567 | A1 | * | 4/2011 | Kramer .................. | A47J 43/04 99/532 |
| 2022/0338490 | A1 | * | 10/2022 | Shao ...................... | A22C 9/001 |

* cited by examiner

*Primary Examiner* — Reginald Alexander
(74) *Attorney, Agent, or Firm* — Camuti Law Group; Nathan Camuti

(57) ABSTRACT

There is provided an aeration device including an interchangeable aeration element having needles arranged in an aeration pattern, a slider including the needles, a slider guide element engaged with the slider, a slider spring element biased to position the slider in an undeployed position, wherein the slider is displaced in a downward direction away from the top end of the aeration device frame towards the bottom end of the aeration device frame when a user applies an operating force to the slider, wherein the slider spring element applies a return force on the slider encouraging the slider to return to the undeployed position, and wherein, when the slider is in a fully deployed position at a maximum displacement from the top end of the aeration device frame, the plurality of puck aeration needles extend passed the bottom end of the aeration device, and a method of using the aeration device.

13 Claims, 8 Drawing Sheets

SYSTEMS AND METHODS FOR IMPROVED BREWING OF GROUND COFFEE

BACKGROUND

Coffee is conventionally brewed by exposing roasted coffee beans to water. Various brewing systems use gravity to draw the water through the ground coffee beans. Other systems use positive pressure to brew the coffee more rapidly. Such positive pressure brewing systems may result in unevenly brewed coffee due to water following the path of least resistance as it flows through the ground coffee. The path of least resistance may not be through the ground coffee, resulting in a majority of the water passing over the top and around the sides of the ground coffee. In some situations, even water passing through the ground coffee may do so unevenly because of uneven pressure distributions and clumping within the ground coffee. Thus, system and methods to more evenly distribute water flow through ground coffee are needed.

SUMMARY

The present disclosure is directed to systems and methods for improved brewing of ground coffee, substantially as shown in and/or described in connection with at least one of the figures, as set forth more completely in the claims.

In one embodiments, the present disclosure includes a system for improved coffee extraction comprising an aeration device frame having a bottom end connected by a structural support element to a top end, the top end opposite the bottom end, a first interchangeable aeration element comprising a plurality of puck aeration needles arranged in an aeration pattern, the first interchangeable aeration element mounted to a slider with the plurality of puck aeration needles extending into an inner volume of the aeration device frame towards the bottom end of the aeration device frame, a slider guide element engaged with the slider, a slider spring element biased to position the slider in an undeployed position, wherein the slider is located at the top end of the aeration device frame in the undeployed position, wherein the slider is displaced in a downward direction away from the top end of the aeration device frame towards the bottom end of the aeration device frame when a user applies an operating force to the slider, wherein the slider spring element applies a return force on the slider encouraging the slider to return to the undeployed position, and wherein, when the slider is in a fully deployed position at a maximum displacement from the top end of the aeration device frame, the plurality of puck aeration needles extend passed a plane of the bottom end of the aeration device frame.

In some embodiments, the aeration pattern is one of a square pattern, a hexagonal pattern, and a circular pattern.

In some embodiments, the top end includes a retention element configured to temporarily engage the slider and retain the slider in the open position while the retention element is engaged.

In some embodiments, an aeration depth adjustment element for adjusting the distance that the plurality of puck aeration needles extend past the plane of the bottom end of the aeration device frame when the slider is in the fully deployed position.

In some embodiments, a puck tamping element for applying a compression force to coffee grounds in a portafilter.

In some embodiments, the puck tamping element includes a plurality of apertures that allow operation of the puck tamping element to compress the coffee grounds in the portafilter with the plurality of puck aeration needles extending through the plurality of apertures.

In some embodiments, a second interchangeable aeration element including a plurality of puck aeration needles, wherein the aeration pattern of the second interchangeable aeration element is different from the aeration pattern of the first interchangeable aeration element, and wherein the second interchangeable aeration element is installable in the slider when the first interchangeable aeration element is removed.

In some embodiments, the return force applied by the slider spring element increases with a greater displacement of the slider.

In some embodiments, the slider spring element is one of a mechanical spring, an air spring, and a motorized spring.

In some embodiments, each of the plurality of puck aeration needles is replaceable in the first interchangeable aeration element.

In some embodiments, the system includes a bushing encircling the slider guide element to facilitate smooth and repeated actuation.

In some embodiments, the bushing is composed of a material selected from a group consisting of rubber, polyurethane, plastic, aluminum, steel, bronze, nylon, and metal polymer composite.

In some embodiments, the slider is deployed by one of a manual deployment, an electric motor deployment, and an air-powered deployment.

In some embodiments, the system further includes one of a lead screw sliding rail and a servo sliding rail, wherein one of the lead screw sliding rail and the servo sliding rail deploys the slider downwards to the fully deployed position and returns the slider upwards to the undeployed position.

The present disclosure includes a method of brewing coffee in a portafilter, the method comprising dispensing a brewing portion of ground coffee into a filter basket of the portafilter, mounting an improved coffee aeration device to a top side of the portafilter, the improved coffee aeration device comprising an aeration device frame having a bottom end connected by a structural support element to a top end, the top end opposite the bottom end, a first interchangeable aeration element comprising a plurality of puck aeration needles arranged in an aeration pattern, the first interchangeable aeration element mounted to a slider with the plurality of puck aeration needles extending into an inner volume of the aeration device frame towards the bottom end of the aeration device frame, a slider guide element engaged with the slider, a slider spring element biased to position the slider in an undeployed position, wherein the slider is located at the top end of the aeration device frame in the undeployed position, wherein the slider is displaced in a downward direction away from the top end of the aeration device frame towards the bottom end of the aeration device frame when a user applies an operating force to the slider, wherein the slider spring element applies a return force on the slider encouraging the slider to return to the undeployed position, and wherein, when the slider is in a fully deployed position at a maximum displacement from the top end of the aeration device frame, the plurality of puck aeration needles extend passed a plane of the bottom end of the aeration device, operating the improved coffee aeration device to pierce a plurality of aeration holes in a coffee puck of the portafilter, wherein the plurality of aeration holes corresponds to the plurality of puck aeration needles in the first interchangeable aeration element, brewing coffee using the aerated coffee puck in the portafilter.

In some implementations, the plurality of aeration holes in the coffee puck each create a path of less resistance for a liquid flowing through the coffee puck.

In some implementations, brewing coffee includes passing water through the coffee puck from a top side of the coffee puck, the water contacts the ground coffee of the coffee puck and extracts botanicals from the ground coffee.

In some implementations, the water is heated water.

In some implementations, the botanicals include at least one of a coffee flavor, a coffee oil, and caffeine.

In some implementations, the improved coffee aeration device is deployed by one of a manual deployment, an electrically motorized deployment, and an air-powered deployment.

In some implementations, the method further comprises a bushing encircling the slider guide element to facilitate smooth and repeated actuation.

DETAILED DESCRIPTION

Figure 1:
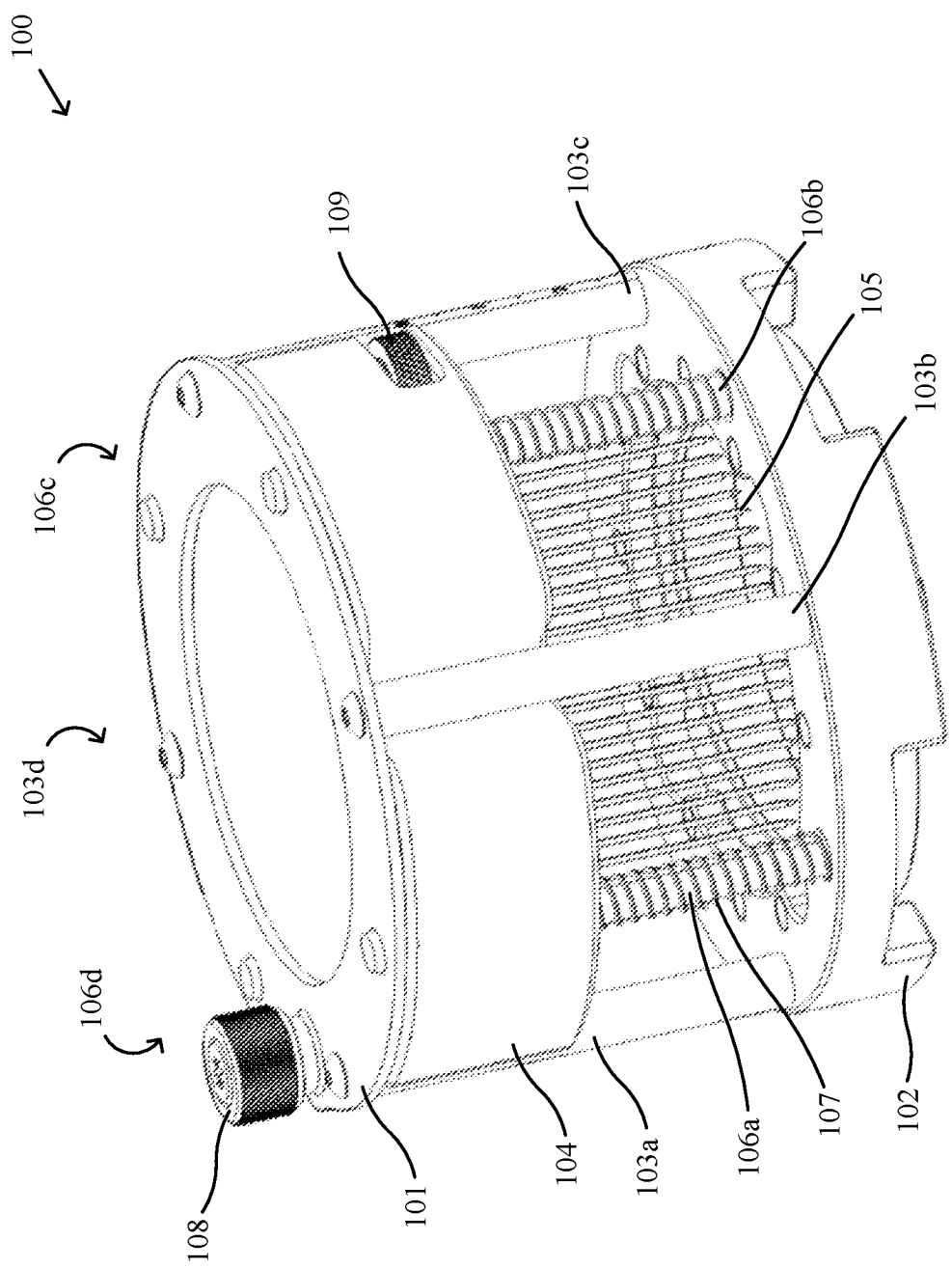
FIG. 1 shows a diagram of an exemplary system for improved brewing of ground coffee, according to one embodiment of the present disclosure.

The following description contains specific information pertaining to embodiments in the present disclosure. The drawings in the present application and their accompanying detailed description are directed to merely exemplary embodiments. Unless noted otherwise, like or corresponding elements among the figures may be indicated by like or corresponding reference numerals. Moreover, the drawings and illustrations in the present application are generally not to scale and are not intended to correspond to actual relative dimensions.

FIG. 1 shows a system for improved coffee extraction, according to one embodiment of the present disclosure. Aeration device 100 includes a frame with a top plate 101 and a bottom ring 102 connected by frame elements 103a, 103b, 103c, and 103d (103d not visible in this view). In some embodiments, top plate 101 may be a metal plate formed to provide shape and support to aeration device 100 and may be secured to the frame elements 103a, 103b, 103c, and 103d using screws or bolts to rigidly connect aeration device 100 to each of frame elements 103a, 103b, 103c, and 103d. In other embodiments, top plate 101 and frame elements 103a, 103b, 103c, and 103d may be formed from the same piece of material, such as when portions of the frame of aeration device 100 are machined from a single blank or are molded.

Frame elements 103a, 103b, 103c, and 103d extend between top plate 101 and bottom ring 102 and may be connected to bottom ring 102 using screws or bolts to rigidly connect the pieces together. In other embodiments, bottom ring 102 and frame elements 103a, 103b, 103c, and 103d may be formed from the same piece of material, such as when portions of the frame of aeration device 100 are machined from a single blank or are molded. Frame elements 103a, 103b, 103c, and 103d may be structural support elements of aeration device 100.

Bottom ring 102 is a rigid ring forming the bottom end of aeration device 100. In some embodiments, bottom ring 102 has an outer diameter similar to or slightly greater than the outer diameter of a portafilter used in an espresso or coffee brewing machine. Bottom ring 102 defines an aperture at the bottom end of aeration device 100. In some embodiments, the diameter of the aperture is the inner diameter of bottom ring 102. Bottom ring 102 may include a portafilter engagement interface allowing aeration device 100 to engage with a standard sized portafilter and operate to aerate ground coffee loaded in the portafilter.

In some embodiments, aeration device 100 may include an optional portafilter adapter ring allowing aeration device 100 to engage with various standard sized portafilters, such as a 58-millimeter (mm) portafilter. In some embodiments, aeration device 100 may have a plurality of optional portafilter adapter rings of various sizes for engaging with portafilters of corresponding sizes. Portafilters used by conventional manufacturers range in size from about 40 mm to about 58 mm. Aeration device 100 may include an optional portafilter adapter ring for some or all of the sizes in this range. In other embodiments, aeration device 100 may include a portafilter adapter ring that may engage with various portafilters of different diameters.

As shown in FIG. 1, aeration device 100 includes slider 104 mounted in the frame formed by top plate 101, bottom ring 102, and frame elements 103a, 103b, 103c, and 103d. In some embodiments, aeration device 100 may include at least one frame element, such as a cylindrical wall enclosing the volume between top plate 101 and bottom ring 102. In other embodiments, aeration device 100 includes two or more frame elements. For example, aeration device 100 may include two frame elements, three frame elements, four frame elements, five frame elements, six frame elements, or more, extending between top plate 101 and bottom ring 102. Top plate 101, bottom ring 102, frame elements 103, the optional portafilter adapter ring may be made from metal, plastic, polymer, composite, or other rigid materials. In some embodiments, various elements of aeration device 100 may be made from different materials.

Slider 104 is an operable sliding mechanism that includes a mounting interface for mounting an interchangeable aeration element. The interchangeable aeration element includes a plurality of aeration needles 105. In some embodiments, aeration needles 105 may be replaceable. Aeration needles 105 may be arranged in a configuration allowing them to pass through the aperture at the bottom end of aeration device 100 when a user operates aeration device 100. The arrangement of aeration needles 105 may be configured to be compatible with portafilters of a certain size. The arrangement of aeration needles 105 may be configured to be compatible with a portafilter of any size. The arrangement of aeration needles 105 may be configured to be compatible with the portafilter adapter ring used to engage aeration device 100 with a portafilter of any size, allowing aeration needles 105 to pass through bottom ring 102 and extend beyond the plane of the bottom end of aeration device 100. To operate aeration device 100, a user may apply a force to the top side of slider 104 by pressing in the annular opening in top plate 101 to displace slider 104 towards the bottom end of aeration device 100 to aerate ground coffee in the portafilter. In some embodiments, the user may manually apply a force to operate aeration device 100. In some embodiments, the displacement of slider 104 towards the bottom end of aeration device 100 may be operated via one of an electric motor and an air-powered displacement. In some embodiments, the electric motor is a servo motor operated to deploy slider 104 downwards to a deployed position. In some embodiments, the electric motor is the servo motor operated to return deployed slider 104 upwards to an undeployed position.

In some embodiments, aeration device 100 includes slider guide elements 106a, 106b, 106c (not visible), and 106d (not visible), extending between top plate 101 and bottom ring 102. In some embodiments, slider guide elements 106a, 106b, 106c, and 106d, may guide slider 104 from an undeployed position with slider 104 located at the top end of aeration device 100 near top plate 101 (as shown in FIG. 1), to a fully deployed position with slider 104 located near bottom ring 102. When slider 104 is operated, aeration needles 105 are displaced from the undeployed position towards the bottom end of aeration device 100. As slider 104 is displaced, aeration needles 105 extend past the bottom end of aeration device 100. Slider 104, slider guides 106 may be made from metal, plastic, polymer, composite, or other rigid materials. In some embodiments, various elements of aeration device 100 may be made from different materials. In some embodiments, slider guide elements 106a, 106b, 106c, and 106d may be structural support elements of aeration device 100.

When aeration device 100 is installed on a portafilter with ground coffee in the portafilter basket and operated, aeration needles 105 enter into the coffee puck creating aeration bores in the ground coffee. In some embodiments, aeration device 100 includes at least one slider guide element. In other embodiments, aeration device 100 may include two slider guide elements, three slider guide elements, four slider guide elements, five slider guide elements, six slider guide elements, or more. In some embodiments, aeration device 100 includes a plurality of guide bushings (not pictured) installed around the plurality of slider guide elements. The guide bushings may be configured to partially or completely encircle and slide against the slider guide element each time the slider 104 is deployed and returned to the undeployed position. The guide bushing facilitates a smooth, precise, and consistent movement of the slider 104 for repeated actuation. The guide bushings are made of a material selected from the group consisting of rubber, polyurethane, plastic, aluminum, steel, bronze, nylon, and metal polymer composite. In some embodiments, aeration device 100 includes a slider spring element.

As shown in FIG. 1, slider spring element 107 is a spring installed around slider guide element 106a with corresponding slider spring elements installed around slider guide elements 106b, 106c, and 106d. Slider spring element 107 may be one of a mechanical spring, an air spring, and a motorized spring. A motorized spring may be a motor that returns slider 104 from a deployed position to the undeployed position when the motorized spring is operated. In some embodiments, the motorized spring may be a motor. Slider spring element 107 is configured to return slider 104 to the undeployed position after each use of aeration device 100. In some embodiments, slider spring element 107 may apply a return force to slider 104 when a user operates aeration device 100 by deploying slider 104. The return force exerted by slider spring element 107 may increase as the displacement of slider 104 increases. In some embodiments, slider spring element 107 may be biased to return slider 104 to the undeployed position after operation of aeration device 100. In some embodiments, aeration device 100 has one of a lead screw sliding rail and a servo sliding rail for deploying slider 104 downwards to the deployed position and returning slider 103 upwards to the undeployed position.

In some embodiments, aeration device 100 includes a retention element 108 for temporarily securing and retaining slider 104 in the undeployed position when aeration device 100 is not in use. As shown in FIG. 1, retention element 108 is a turn-screw style system with a threaded portion extending through top plate 101 that engages a corresponding threaded receiving port in slider 104. When a user operates retention element 108, the threaded portion engages the threaded port and retains slider 104 in the undeployed position. In another embodiment, retention element 108 may be a non-threaded system with a non-threaded fastener such that inserting the non-threaded fastener into a corresponding receiving port engages a locking mechanism which retains slider 104 in the undeployed position. The non-threaded fastener may be a lock pin, a ball lock pin, a cotter pin, and a quick lock pin. With retention element 108 engaged, slider 104 will be prevented from leaving the undeployed position, even if an unintentional force incidentally attempts to move slider 104. Retention element 108 may prevent accidental operation of aeration device 100 during storage and cleaning of aeration device 100.

As shown in FIG. 1, aeration device 100 includes depth adjustment element 109. Depth adjustment element 109 may be an adjustment for changing the position of the mount for the interchangeable insert mounted in slider 104. A user may rotate depth adjustment element 109 to adjust the distance that aeration needles 105 extend beyond the plane of the bottom of aeration device 100 when slider 104 is in the fully deployed position. A change in the distance that aeration needles 105 extend may affect the depth of the aeration bores pierced in the coffee puck of the portafilter. The depth of aeration bores in a coffee puck may change how water flows through the puck which changes the way that water flows through the ground coffee of the puck affecting the characteristics of the coffee brewed.

Figure 2A:
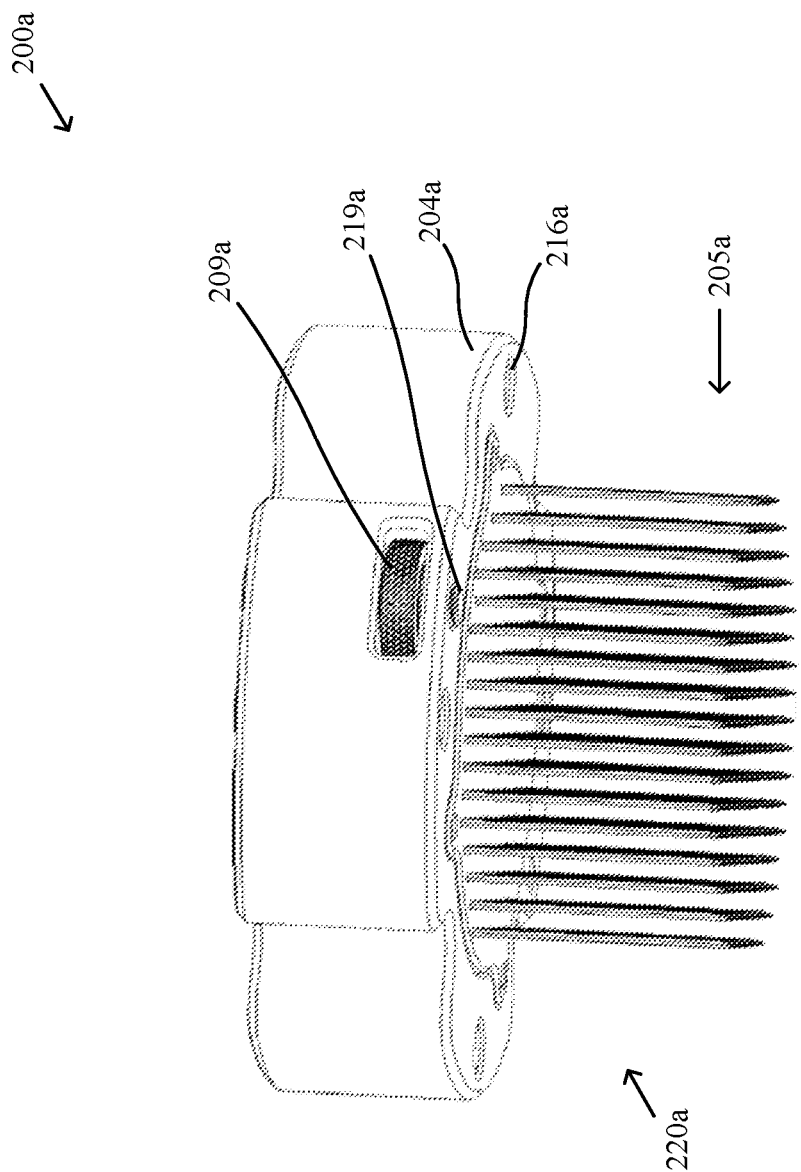
FIG. 2a shows a diagram of an exemplary slider assembly for use with the system shown in FIG. 1, according to one embodiment of the present disclosure.

FIG. 2a shows a diagram of an exemplary slider assembly for use with the system shown in FIG. 1, according to one embodiment of the present disclosure. Diagram 200a shows slider 204a with interchangeable aeration element 220a installed. As shown in FIG. 2a, slider 204a includes guide port 216a. Guide port 216a tracks over slider guide element 106a when slider 204a is installed in aeration device 100. Slider 204a includes depth adjustment element 209a and depth adjustment bolt 219a. Aeration needles 205a extend down from the lower side of slider 204a. A user may operate depth adjustment element 209a by rotating depth adjustment element 209a. The depth adjustment port in slider 204a holds depth adjustment element 209a at a relatively consistent position in the height of slider 204a. Rotation of depth adjustment element 209a causes depth adjustment bolt 219a to move up or down in the height of slider 204a. Operation of depth adjustment element 209a adjusts the distance that depth adjustment bolt 219a protrudes out of the bottom of the slider 204a. The greater the length that depth adjustment bolt 219a protrudes out of the bottom of slider 204a, then the shorter the distance that slider 204a slides once deployed because the portion of depth adjustment bolt 219a protruding out of the bottom of slider 204a comes into contact with the bottom ring of the aeration device, thereby affecting the distance that aeration needles 205a pierce into a coffee puck when slider 204 is deployed.

Figure 2B:
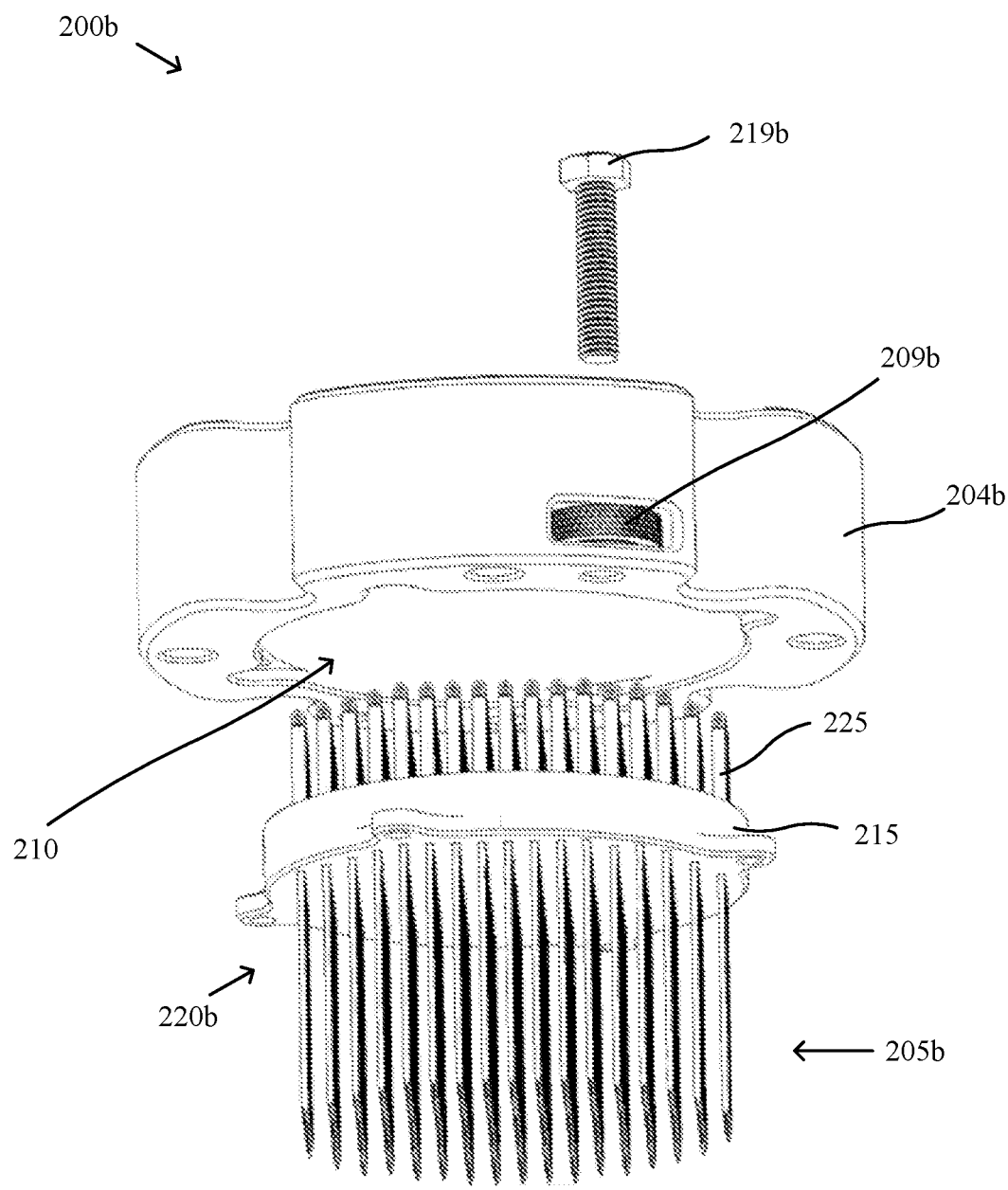
FIG. 2b shows an exploded view of the slider assembly shown in FIG. 2a, according to one embodiment of the present disclosure.

FIG. 2b shows an exploded view of the slider assembly shown in FIG. 2a, according to one embodiment of the present disclosure. Diagram 200b shows slider 204b includes mounting port 210 for receiving interchangeable aeration element 220b. Mounting port 210 includes a cavity in the volume of slider 204b for accommodating upper portions 225 of aeration needles 205b that extend above mounting plate 215. Mounting port 210 has a height that is greater than the distance upper portions 225 of aeration needles 205b extend above the top side of mounting plate 215. A user may adjust the distance slider 204b moves downwards by operating depth adjustment element 209b, thereby controlling the depth that aeration needles 205b pierce into a coffee puck. Depth adjustment bolt 219b is shown removed from slider 204b. According to one embodiment of the present disclosure, depth adjustment element 209b and depth adjustment bolt 219b interact via a threaded engagement mechanism. When depth adjustment element 209b is adjusted in a first direction, depth adjustment bolt 219b shifts upwards within slider 204b protruding less from the bottom of slider 204b. When depth adjustment element 209b is adjusted in a second direction, depth adjustment bolt 219b shifts downwards protruding further from the bottom of slider 204b. The greater the length that depth adjustment bolt 219b protrudes from the bottom of slider 204b, the shorter the distance slider 204b moves from the undeployed position when slider 204b is operated because depth adjustment bolt 219b comes into contact with the bottom ring of the aeration device, preventing further downward movement. Conversely, the shorter the length depth adjustment bolt 219b protrudes, if at all, from a bottom of slider 204b, the greater the distance slider 204b may slide down when deployed. The distance slider 204b slides down will affect the depth that aeration needles 206b pierce into a coffee puck when slider 204b is deployed.

Figure 3:
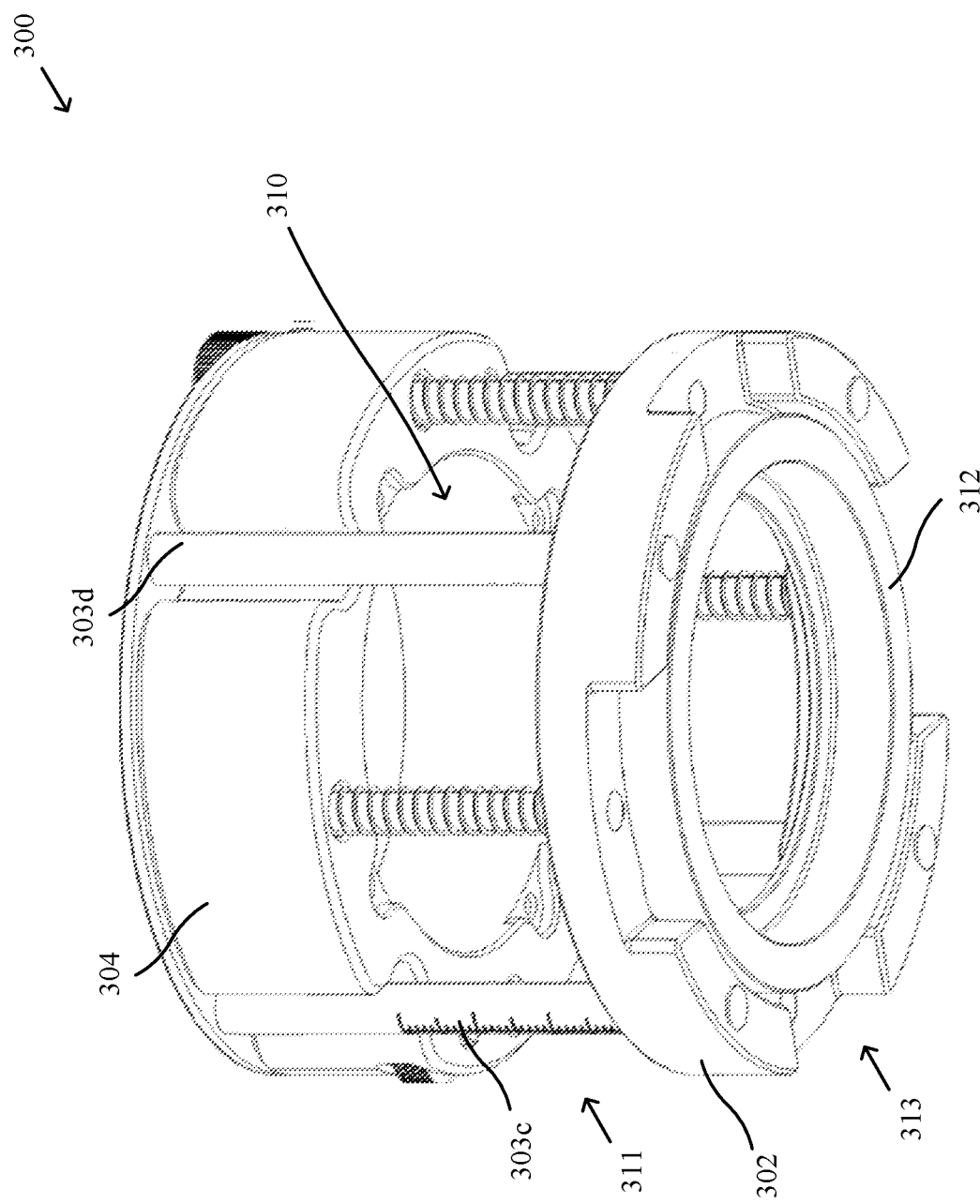
FIG. 3 shows a diagram of another view of the system of FIG. 1 without the insert, according to one embodiment of the present disclosure.

FIG. 3 shows a system for improved coffee extraction, according to one embodiment of the present disclosure. Aeration device 300 shows a lower perspective view of an aeration device 300 without an interchangeable aeration element installed. As shown in FIG. 3, slider 304 includes mounting port 310 for receiving the interchangeable aeration element. Slider 304 has a depth that, in some embodiments, allows an upper section of the aeration needles that extend above the mounting plate of the interchangeable aeration element to be housed in a housing cavity above mounting port 310 within the volume of slider 304. Frame element 303c includes graduated measurement scale 311 used to measure a distance slider 304 may slide downward, thereby indicating the depth the aeration needles (not shown in FIG. 3) may pierce into a coffee puck once slider 304 is deployed. According to one embodiment, graduated measurement scale 311 may be used to measure the maximum distance that slider 304 travels downward when deployed, thereby controlling the depth of that aeration needles pierce into a coffee puck. In another embodiment, graduated measurement scale 311 may serve as a reference indicator for determining the length a depth adjustment bolt protrudes out of the bottom of slider 304 when adjusting the depth adjustment element. Bottom ring 302 includes adapter ring 312 and portafilter engagement interface 313.

Adapter ring 312 is a ring configured to adapt the diameter of aeration device 300 to interface with a portafilter having a smaller size. In some embodiments, adapter ring 312 may be interchangeable so that aeration device 300 may be compatible with various sizes of portafilters. In some embodiments, aeration device 300 may be configured to fit a largest size portafilter such that installation and utilization of adapter ring 312 may make aeration device 300 compatible with a smaller sized portafilter. Aeration device 300 may have various diameters of adapter ring 312 to enable aeration device 300 to be universally compatible with different sized portafilters used in the marketplace. Portafilter engagement interface 313 is configured to engage with the mounting flange extending from the lip of a portafilter. In some embodiments, aeration device 100 engages the mounting flange of the portafilter by a sliding or twisting motion of the portafilter engagement interface 313 over the mounting flange of the portafilter.

Aeration device 300 includes two pairs of opposing engagement interfaces, allowing aeration device 300 to interface with a portafilter in numerous orientations. In some embodiments, a pair of opposing engagement interfaces may include cut-outs configured to engage with the mounting flanges of a coffee portafilter. In one embodiment, the portafilter engagement interface 313 may engage with the portafilter at a first orientation so that the aeration needles pierce a first pattern of aeration bores when the slider 304 is deployed. Then, after returning slider 304 to the undeployed position, aeration device 300 may be rotated such that the portafilter engagement interface 313 engages with the portafilter at a second orientation so that the aeration needles pierce a second pattern of aeration bores in the same coffee puck when the slider 304 is deployed a second time. In some embodiments, the first orientation may differ from the second orientation by a rotation through an angle of about thirty degrees, forty-five degrees, sixty degrees, ninety degrees, one hundred eighty degrees, or any combination thereof. The coffee puck will then have double the number of bores created with a single operation of aeration device 100. This operation may be repeated resulting in a multiple of aeration bores pierced in the puck equal to the number of incremental rotations, until the incremental rotations total a compete rotation through three hundred and sixty degrees.

Figure 4A:
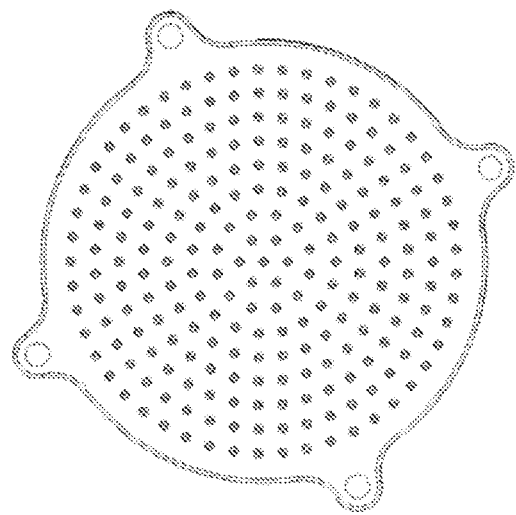
FIG. 4a shows a diagram of an exemplary insert having an exemplary aeration pattern, according to one embodiment of the present disclosure.

FIG. 4a shows a diagram of an exemplary insert having an exemplary aeration pattern, according to one embodiment of the present disclosure. The exemplary insert refers to the interchangeable aeration element comprised of at least aeration needles and mounting plate. As shown in FIG. 4a, the exemplary insert has an aeration pattern with aeration needles arranged in concentric circles. In some embodiments, the density of aeration needles may be higher, having more aeration needles packed closer together, or less dense, having fewer aeration needles in the interchangeable aeration insert. The density of the aeration needles may affect the performance of aeration device 100. An exemplary insert with too high a density of aeration needles may result in ground coffee becoming lodged between the aeration needles and being removed from the coffee puck when the slider retracts from the fully deployed position. A density of aeration needles that is too sparse may result in the coffee puck not being fully or evenly exposed to the brewing medium, resulting in under-brewed coffee. Accordingly, some embodiments of aeration device 100 may be deployed more than once into the same coffee puck at different orientations so that more bores can be created with a pattern of less dense aeration needles to prevent ground coffee becoming lodged between the needles when the slider retracts.

The aeration pattern of aeration needles in the interchangeable aeration element may affect the performance of aeration device 100. The aeration pattern may affect the way that water introduced into the coffee puck flows through the coffee puck. An exemplary insert may contain aeration needles with different diameters and lengths. For different aeration patterns, the distance between aeration bores pierced in the coffee puck is different. Accordingly, different aeration patterns may result in different amounts of extraction of the ground coffee in the brewing process. As the water flows through the ground coffee, the aeration bores create a path of less resistance resulting in the water filling the aeration bores before passing through the more densely packed volume of the coffee puck. The different aeration patterns may result in different amounts of exposure to the water, creating a brewed coffee with different flavor profiles. As the water flows through the coffee puck, it extracts botanicals from the ground coffee beans, such as flavors, oils, and caffeine.

Figure 4B:
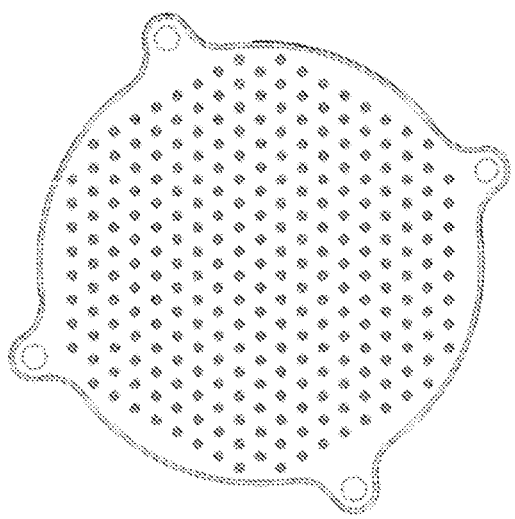
FIG. 4b shows a diagram of another exemplary insert having another exemplary aeration pattern, according to one embodiment of the present disclosure.

In the depicted embodiment, the aeration pattern of aeration needles is positioned throughout the exemplary insert from a center of the exemplary insert to an edge of the exemplary insert. In some embodiments, the aeration pattern of aeration needles is concentrated in the center of the exemplary insert while the remainder of the exemplary insert is empty. In some embodiments, the aeration pattern of aeration needles is positioned only around the rim or the circumference of the exemplary insert with the center of the exemplary insert remaining empty, to bias the water flow. In another embodiment, a user may selectively arrange the aeration needles on the exemplary insert, thereby creating different aeration patterns of aeration needles. FIG. 4b shows a diagram of another exemplary insert having another exemplary aeration pattern, according to one embodiment of the present disclosure. As shown in FIG. 4b the aeration pattern may be a hexagonal pattern.

Figure 4C:
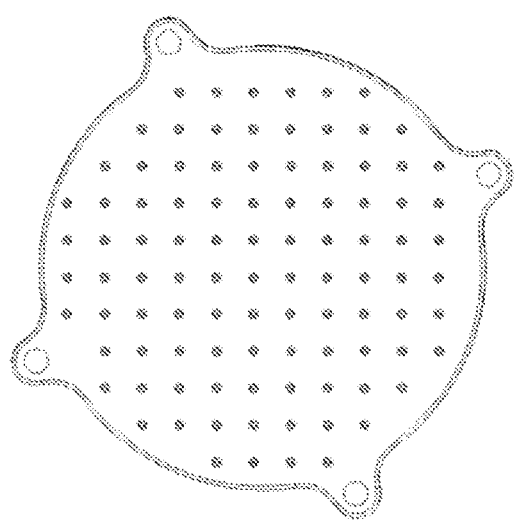
FIG. 4c shows a diagram of another exemplary insert having another exemplary aeration pattern, according to one embodiment of the present disclosure.

FIG. 4c shows a diagram of another exemplary insert having another exemplary aeration pattern, according to one embodiment of the present disclosure. As shown in FIG. 4c, the aeration pattern may be a square pattern.

Figure 5:
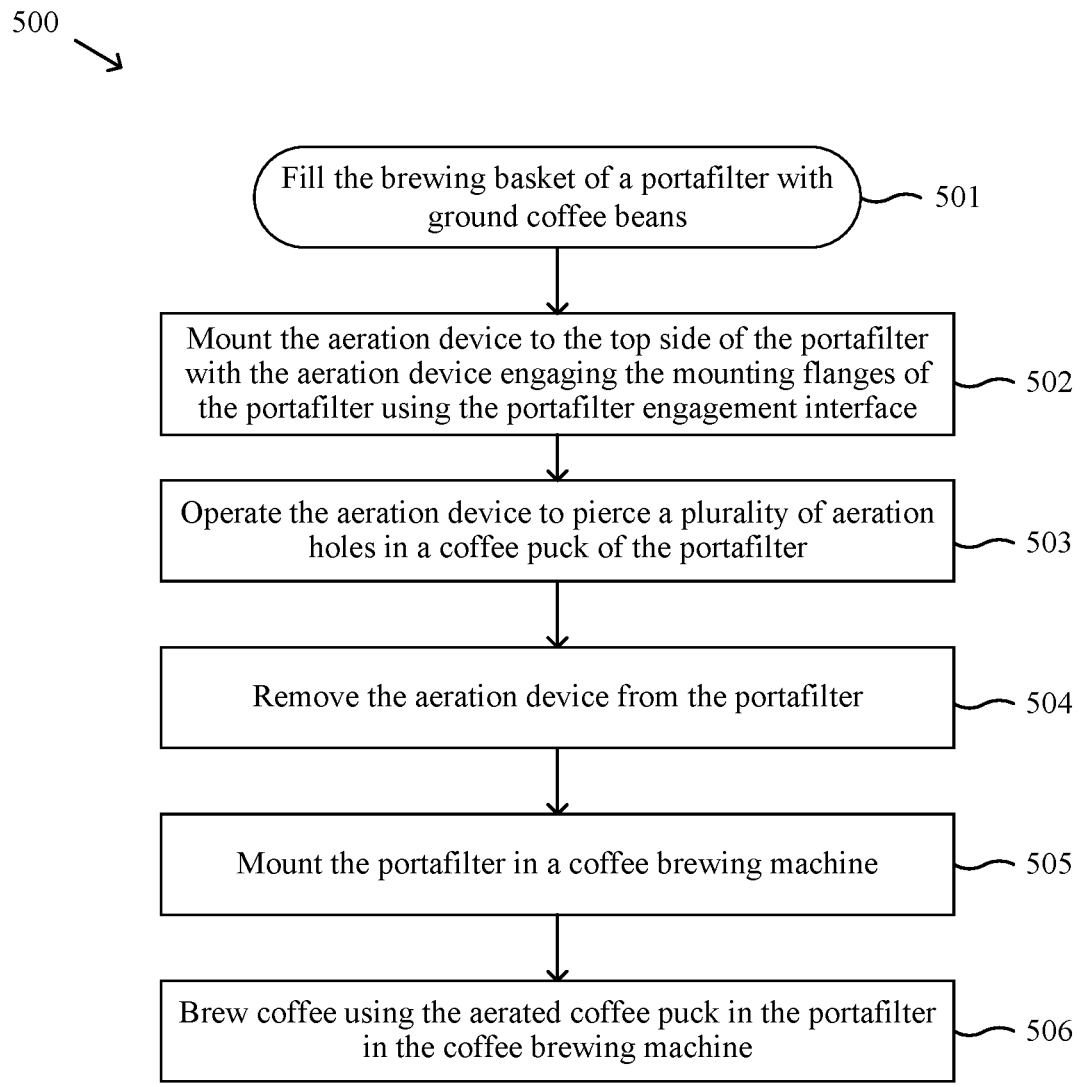
FIG. 5 shows a flowchart illustrating an exemplary method of improved brewing of ground coffee, according to one implementation of the present disclosure.

FIG. 5 shows a flowchart illustrating an exemplary method of brewing coffee with a system for improved coffee extraction, according to one embodiment of the present disclosure. Method 500 begins at 501 by filling the brewing basket of a portafilter with ground coffee beans. The coffee may be ground to the preference of the coffee drinker, the portafilter specifications, and the coffee brewing machine the portafilter is used with. The portafilter specifications may include the diameter of the basket, the depth of the basket, and the filter mesh of the portafilter basket. After loading the ground coffee into the portafilter, the user may optionally stir the ground coffee with a coffee distribution tool to break up any clumps and evenly distribute the ground coffee throughout the portafilter basket. The user may optionally tamp the ground coffee. Tamping the ground coffee may apply a compression force to pack the ground coffee to reduce the space between the grinds. A more tightly packed coffee puck may reduce the flow rate of water through the puck causing the ground coffee to be extracted for a longer time in the brewing process. The amount of time the water is in contact with the ground coffee affects characteristics of the brewed coffee, including the flavor.

Once the ground coffee is loaded into the portafilter, method 500 continues at 502 with the user mounting aeration device 100 to a top side of the portafilter with aeration device 100 engaging the mounting flanges of the portafilter using the portafilter engagement interface. In some embodiments, the aeration device 100 engages the mounting flanges of the portafilter by a sliding or twisting motion. In some embodiments, aeration device 100 may be mounted on the portafilter while the portafilter is held by a user. In other embodiments, the portafilter may be placed in a stand or securing device to hold the portafilter steady. Aeration device 100 may be held in place by the portafilter engagement interface. In some embodiments, the engagement between the portafilter and aeration device 100 may be strengthened by magnets mounted in the bottom ring of aeration device 100 and/or in the recesses of the portafilter engagement interface. Magnets may increase the stability of the connection between aeration device 100 and the portafilter allowing safer and more precise operation of aeration device 100. The user may optionally tamp the ground coffee in the portafilter basket. In some embodiments, aeration device 100 may include a coffee puck tamper configured with a plurality of holes to accommodate operation with the aeration needles passing through the tamper. The tamper may be spring-loaded to retract after tamping.

Method 500 continues at 503 with the user operating aeration device 100 to pierce a plurality of aeration holes in a coffee puck of the portafilter, wherein the plurality of aeration holes corresponds to the plurality of puck aeration needles in the first interchangeable aeration element. A user may press down on the top side of the slider in aeration device 100, applying an operating force to displace the slider downward from the top end of aeration device 100. As the slider is displaced, the aeration needles, extending from the interchangeable aeration element mounted to the slider, extend past the lower end of aeration device 100. The aeration needles pierce the coffee puck in the portafilter, each aeration needle making a corresponding bore in the coffee puck. The aeration bores create spaces of rarefication in the coffee puck. In some embodiments, the coffee puck has been tamped prior to operation of the slider of aeration device 100 to aerate the coffee puck and the aeration bores may remain substantially unfilled after the slider returns to the undeployed position in aeration device 100. In other implementations, the user may optionally tamp the ground coffee puck after aeration. In such a case, aeration of the grounds pre-tamping will create areas of lower density of ground coffee, even after the coffee puck is tamped. The aeration bores allow water to flow more freely through the volume of the coffee puck resulting in a thoroughly exposed puck.

A user may choose one or more points in the brewing process to tamp the ground coffee in the portafilter basket. In some implementations, the user may tamp the ground coffee only before aeration. In other implementations, the user may tamp the ground coffee only after aeration. In still other implementations, the user may tamp the ground coffee before aeration and after aeration. Tamping the coffee puck, even before aeration, creates pathways of rarefication in the coffee puck to allow for complete wetting and exposure of the ground coffee in the puck.

At 504, the user removes aeration device 100 from the portafilter. At 505, the user mounts the portafilter in a coffee brewing machine, such as an espresso machine. At 506, the user brews coffee using the aerated coffee puck in the portafilter in the coffee brewing machine. In some implementations, brewing the coffee may include passing water over the ground coffee or through the aerated coffee puck. The water may be heated water. Once the coffee is brewed, it can be enjoyed by the user or another individual.

Figure 6A:
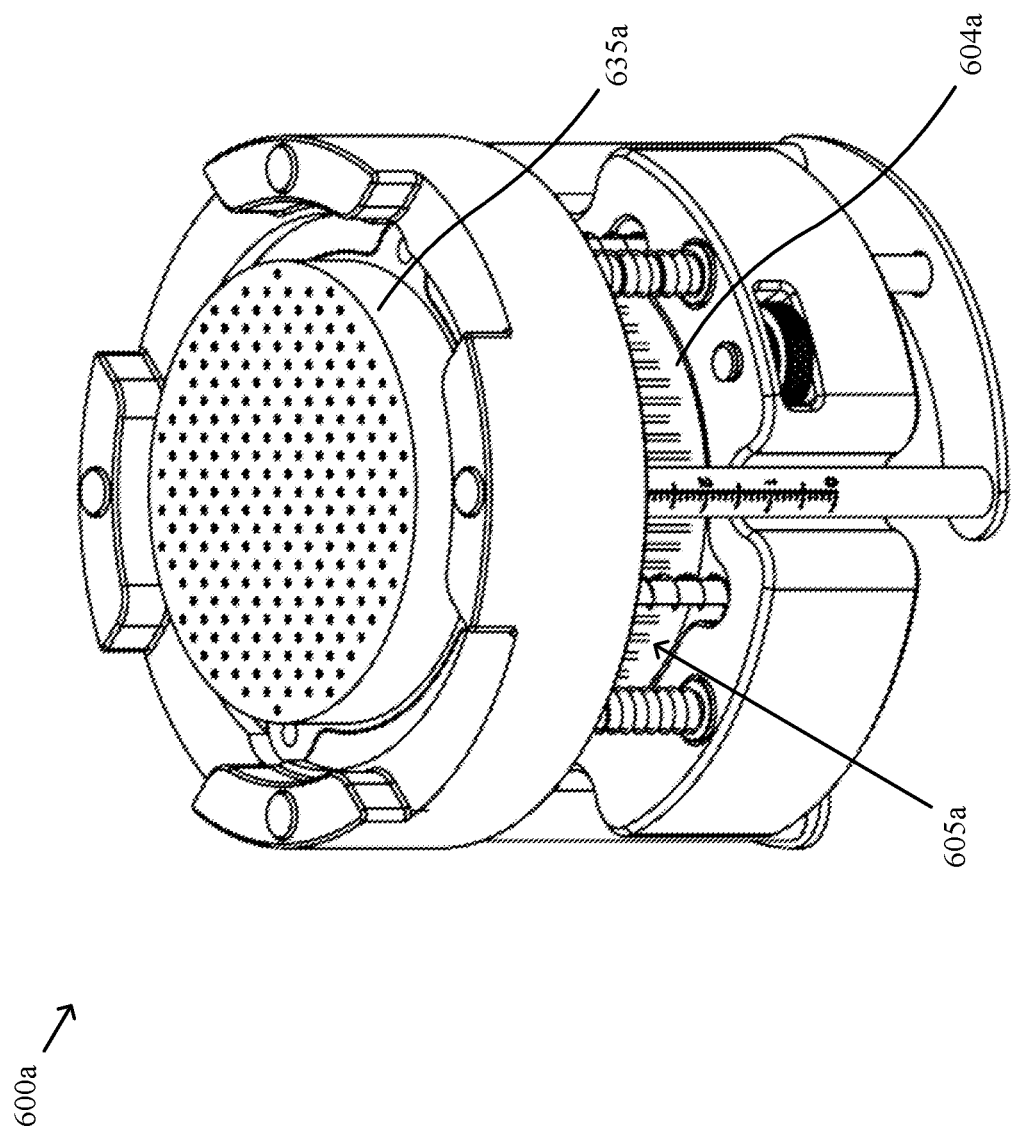
FIG. 6a shows a diagram of another system for improved brewing of ground coffee with the slider in an undeployed position, according to one embodiment of the present disclosure.

FIG. 6a shows a diagram of another system for improved brewing of ground coffee with slider 604a in an undeployed position, according to one embodiment of the present disclosure. As shown in FIG. 6a, aeration device 600a includes tamping element 635a. Tamping element 635a may be configured with a plurality of holes to accommodate operation with aeration needles 605a passing through tamping element 635a. In some embodiments, tamping element 635a may be spring-loaded to retract after tamping.

Figure 6B:
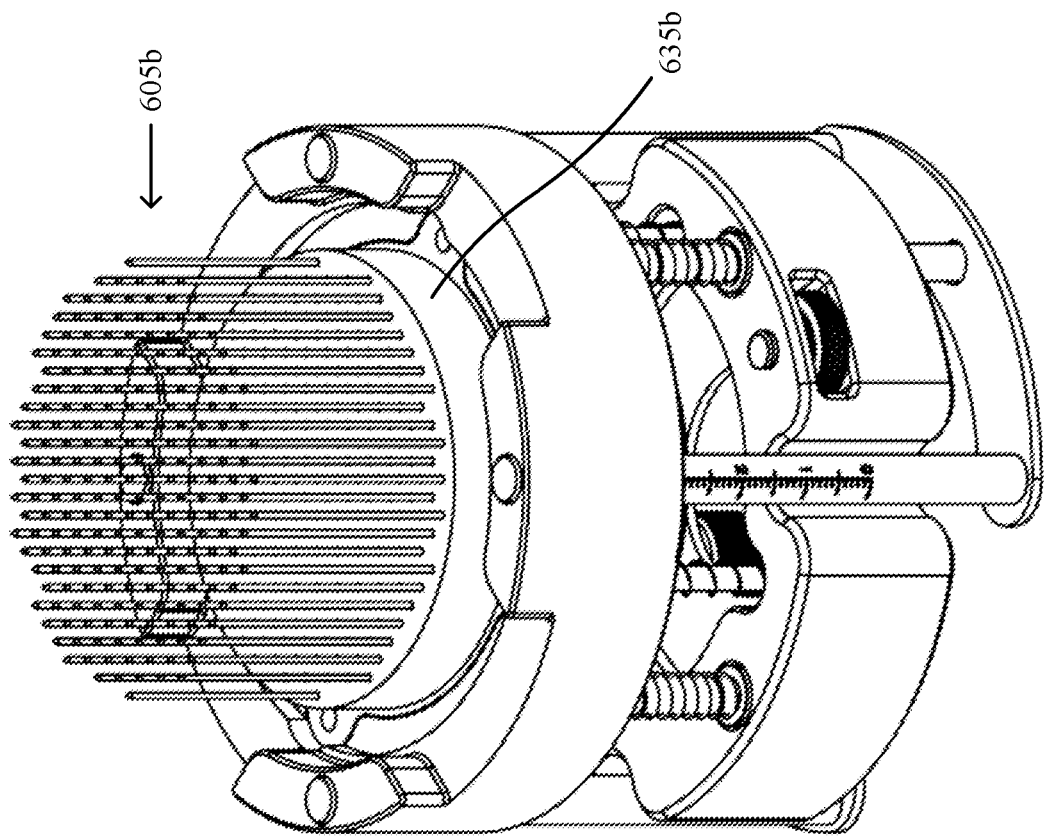
FIG. 6b shows a diagram of the system depicted in FIG. 6a with in the slider in a deployed position, according to one embodiment of the present disclosure.

FIG. 6b shows a diagram of the aeration device 600 with in slider 604b (not shown) in a deployed position. As shown in FIG. 6b, the plurality of aeration needles 605b pass through the corresponding holes in tamping element 635b.

From the above description, it is manifest that various embodiments can be used for implementing the concepts described in the present application without departing from the scope of those concepts. Moreover, while the concepts have been described with specific reference to certain embodiments, a person having ordinary skill in the art would recognize that changes can be made in form and detail without departing from the scope of those concepts. As such, the described embodiments are to be considered in all respects as illustrative and not restrictive. It should also be understood that the present application is not limited to the particular embodiments described above, but many rearrangements, modifications, and substitutions are possible without departing from the scope of the present disclosure.

What is claimed is:

1. A system for improved coffee extraction comprising:
an aeration device frame having a bottom end connected by a structural support element to a top end, the top end opposite the bottom end;
a first interchangeable aeration element comprising a plurality of puck aeration needles arranged in an aeration pattern, the first interchangeable aeration element mounted to a slider with the plurality of puck aeration needles extending into an inner volume of the aeration device frame towards the bottom end of the aeration device frame;
a slider guide element engaged with the slider; and
a slider spring element biased to position the slider in an undeployed position, wherein the slider is located at the top end of the aeration device frame in the undeployed position, wherein the slider is displaced in a downward direction away from the top end of the aeration device frame towards the bottom end of the aeration device frame when a user applies an operating force to the slider, wherein the slider spring element applies a return force on the slider encouraging the slider to return to the undeployed position;
wherein, when the slider is in a fully deployed position at a maximum displacement from the top end of the aeration device frame, the plurality of puck aeration needles extend passed a plane of the bottom end of the aeration device frame.

2. The system of claim 1, wherein the aeration pattern is one of a square pattern, a hexagonal pattern, and a circular pattern.

3. The system of claim 1, wherein the top end includes a retention element configured to temporarily engage the slider and retain the slider in an open position while the retention element is engaged.

4. The system of claim 1, further comprising an aeration depth adjustment element for adjusting a distance that the plurality of puck aeration needles extend past the plane of the bottom end of the aeration device frame when the slider is in the fully deployed position.

5. The system of claim 1, further comprising a puck tamping element for applying a compression force to coffee grounds in a portafilter.

6. The system of claim 5, wherein the puck tamping element includes a plurality of apertures that allow operation of the puck tamping element to compress the coffee grounds in the portafilter with the plurality of puck aeration needles extending through the plurality of apertures.

7. The system of claim 1, further comprising a second interchangeable aeration element including a plurality of puck aeration needles, wherein the aeration pattern of the second interchangeable aeration element is different from the aeration pattern of the first interchangeable aeration element, and wherein the second interchangeable aeration element is installable in the slider when the first interchangeable aeration element is removed.

8. The system of claim 1, wherein the return force applied by the slider spring element increases with a greater displacement of the slider.

9. The system of claim 1, wherein the slider spring element is one of a mechanical spring.

10. The system of claim 1, wherein each of the plurality of puck aeration needles is replaceable in the first interchangeable aeration element.

11. The system of claim 1, further comprising a bushing encircling the slider guide element to facilitate smooth and repeated actuation.

12. The system of claim 11, wherein the bushing is composed of a material selected from a group consisting of rubber, polyurethane, plastic, aluminum, steel, bronze, nylon, and metal polymer composite.

13. The system of claim 1, wherein the slider is deployed by one of a manual deployment.

* * * * *